US012668062B2

(12) United States Patent
Fujikake et al.

(10) Patent No.: US 12,668,062 B2
(45) Date of Patent: Jun. 30, 2026

(54) LIQUID SUPPLY APPARATUS, PRINTING SYSTEM, AND PRINTING APPARATUS

(71) Applicant: CANON KABUSHIKI KAISHA, Tokyo (JP)

(72) Inventors: Akira Fujikake, Kanagawa (JP); Hiromasa Yoneyama, Kanagawa (JP); Daigo Kuronuma, Kanagawa (JP); Hideyuki Nozawa, Tochigi (JP); Tomoyuki Nagase, Kanagawa (JP); Yuto Nitami, Kanagawa (JP); Ryohei Maruyama, Kanagawa (JP); Masakazu Nagashima, Kanagawa (JP); Kichinosuke Hirokawa, Tokyo (JP); Kenta Iimura, Kanagawa (JP); Naoaki Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/643,820

(22) Filed: Apr. 23, 2024

(65) Prior Publication Data

US 2024/0359475 A1 Oct. 31, 2024

(30) Foreign Application Priority Data

Apr. 25, 2023 (JP) ................................ 2023-071690

(51) Int. Cl.
*B41J 2/175* (2006.01)

(52) U.S. Cl.
CPC ....... *B41J 2/17513* (2013.01); *B41J 2/17523* (2013.01); *B41J 2/17556* (2013.01); *B41J 2002/17516* (2013.01)

(58) Field of Classification Search
CPC .... B41J 2/175; B41J 2/17503; B41J 2/17506; B41J 2/17509; B41J 2/17513; B41J 2/17523; B41J 2/17553; B41J 2/17556; B41J 29/02; B41J 2002/17516
See application file for complete search history.

(56) References Cited

U.S. PATENT DOCUMENTS 6,609,789 B1 * 8/2003 Hunt .................... B41J 2/17513 347/86
7,237,880 B2 * 7/2007 Miyazawa ............. B41J 2/1753 347/86
7,422,316 B2 * 9/2008 Shinada ............... B41J 2/17509 347/85
9,440,447 B1 * 9/2016 Maeshima ........... B41J 2/17513
10,308,032 B2 6/2019 Koizumi
10,967,644 B2 4/2021 Hirata
(Continued)

FOREIGN PATENT DOCUMENTS

JP 5621361 B2 11/2014
JP 2015174261 A 10/2015
JP 2021017022 A 2/2021

*Primary Examiner* — Anh T Vo
(74) *Attorney, Agent, or Firm* — Canon U.S.A., Inc., IP Division

(57) ABSTRACT

A liquid supply apparatus configured to supply a liquid to a printing unit, comprising a tray holder configured to hold a tray on which a flexible retaining container configured to retain a liquid is placed, the tray holder allowing insertion of the tray in a first direction, wherein the retaining container has a foldable gusset portion, and the tray holder is provided with a folding unit configured to fold the gusset portion in a state in which the tray is held by the tray holder.

15 Claims, 10 Drawing Sheets

(56) References Cited

U.S. PATENT DOCUMENTS

| | | | | |
|---|---|---|---|---|
| 2005/0237368 | A1* | 10/2005 | Matsumoto | B41J 2/17513 347/86 |
| 2008/0225093 | A1 | 9/2008 | Nozawa | |
| 2009/0207218 | A1 | 8/2009 | Kimura | |
| 2013/0222491 | A1 | 8/2013 | Nanjo | |
| 2014/0292961 | A1 | 10/2014 | Maeshima | |
| 2016/0288510 | A1 | 10/2016 | Kumagai | |
| 2018/0215161 | A1* | 8/2018 | Koizumi | B41J 2/17523 |
| 2020/0122471 | A1* | 4/2020 | Hirata | B41J 2/17553 |

* cited by examiner

LIQUID SUPPLY APPARATUS, PRINTING SYSTEM, AND PRINTING APPARATUS

BACKGROUND OF THE INVENTION

Field of the Invention

The present invention relates to a liquid supply apparatus, a printing system, and a printing apparatus including the liquid supply apparatus.

Description of the Related Art

Some printing apparatuses represented by inkjet printers and the like use a deformable bag-like flexible container as a tank for retaining ink (see Japanese Patent Laid-Open No. 2021-17022).

In a case where the above flexible container is used as a tank, as the ink remaining amount decreases with the consumption of ink, the tank collapses. For this reason, ink remains at end portions (corner portions) of the tank, and hence ink may not be properly consumed completely. This can cause a deterioration in the productivity of printing, an increase in cost, and the like. The same applies to a case where a liquid other than ink is used.

SUMMARY OF THE INVENTION

The present invention aims to improve the productivity of printing.

One aspect of the present invention provides a liquid supply apparatus configured to supply a liquid to a printing unit, comprising a holder configured to hold a tray on which a flexible container configured to contain a liquid is placed, the holder allowing insertion of the tray in a first direction, wherein the container has a foldable gusset portion, and the holder is provided with a folding unit configured to fold the gusset portion in a state in which the tray is held by the holder.

Further features of the present invention will become apparent from the following description of embodiments (with reference to the attached drawings).

DESCRIPTION OF THE EMBODIMENTS

Figure 1:
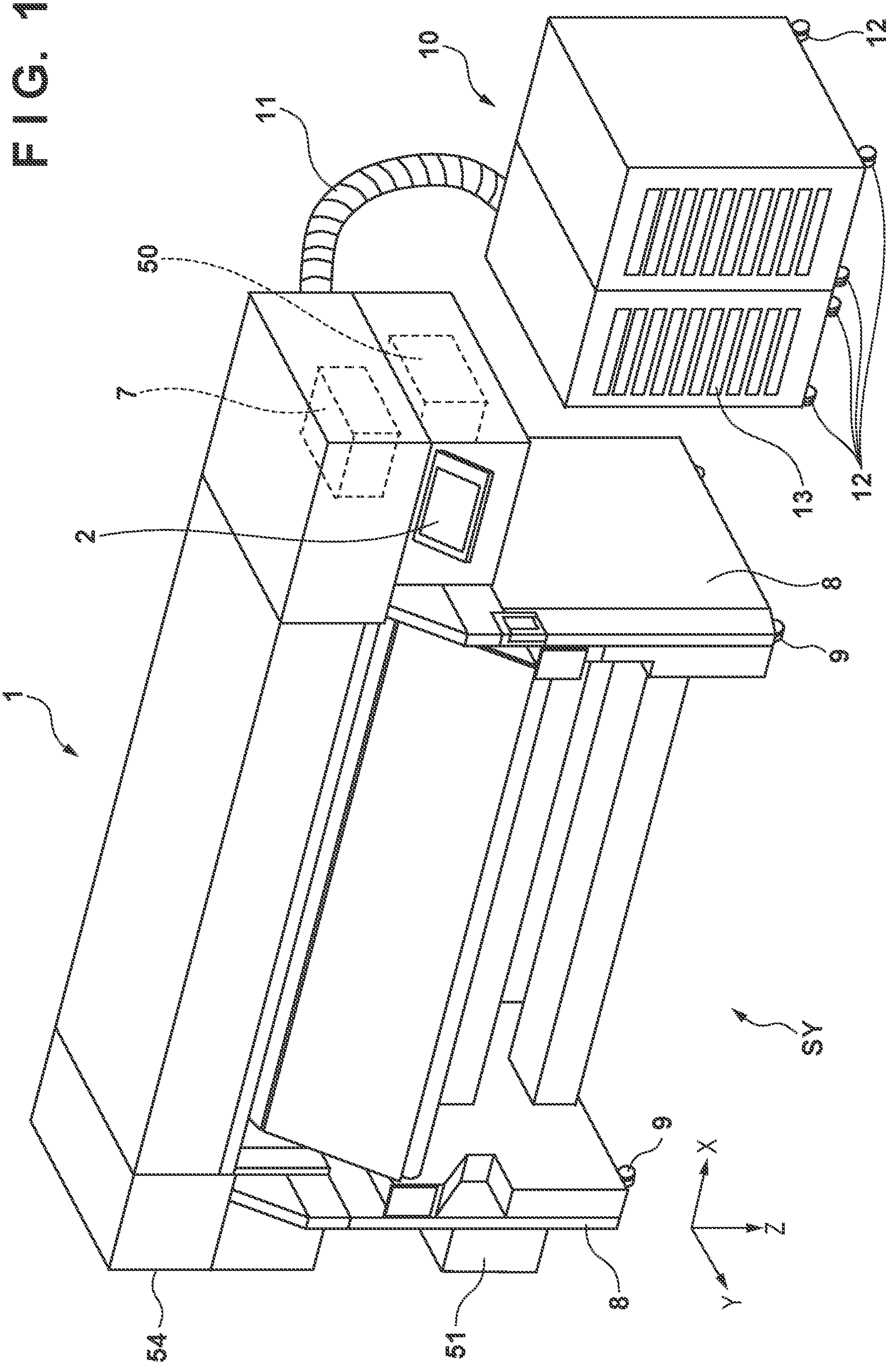
FIG. 1 is a perspective view showing an example of the arrangement of a printing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Overall Arrangement

FIG. 1 is a schematic view showing an example of the arrangement of a printing system SY according to the first embodiment. To record means to form an image on a sheet-like print medium such as a paper material and may be reworded as to print or the like. The concept of images typically includes visibly recognizable things that can be formed with printing materials having predetermined colors, such as characters, symbols, graphic patterns, and photos but may further include visibly unrecognizable things that can be formed with a colorless printing material. The printing system SY includes a printing apparatus 1 and a liquid supply apparatus 10. The printing apparatus 1 performs printing by discharging the liquid supplied from the liquid supply apparatus 10 onto a print medium.

Referring to FIG. 1, for the facilitation of the understanding of the apparatus structure, the left-right direction or widthwise direction of the apparatus is indicated as the X direction, the front-back direction or depth direction of the apparatus is indicated as the Y direction, and the up-down direction or height direction of the apparatus is indicated as the Z direction. Note that the +X direction, the +Y direction, and the +Z direction respectively indicate the left side, the front side, and the lower side.

Figure 2A:
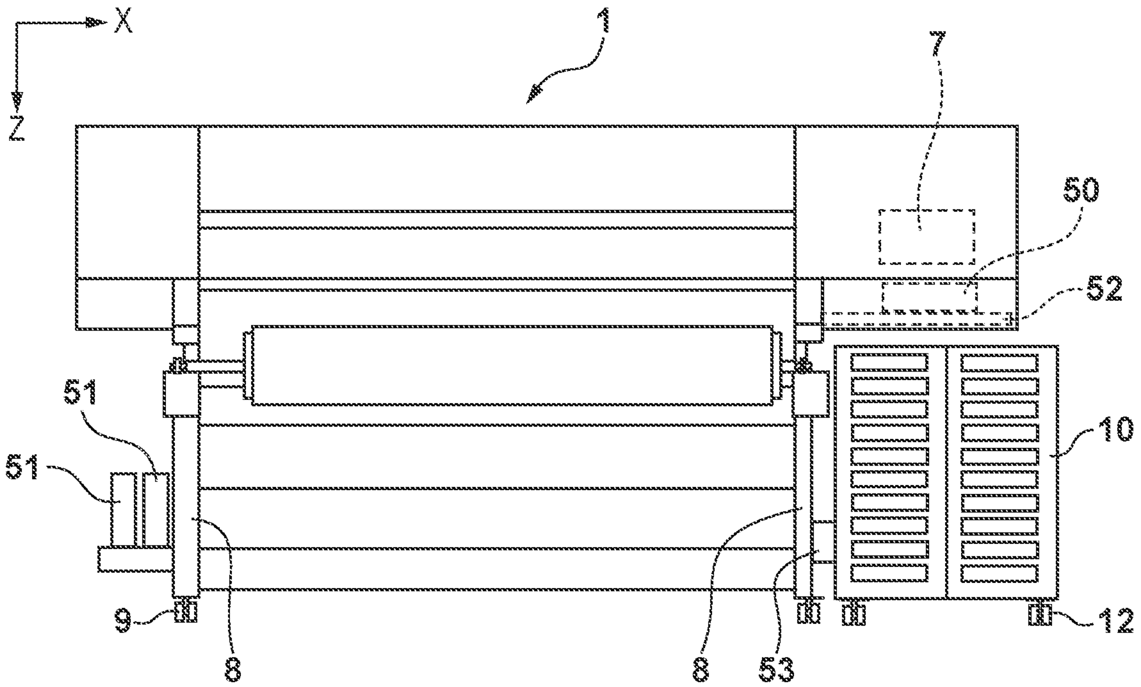
FIG. 2A is a schematic front view of the printing system.
Figure 2B:
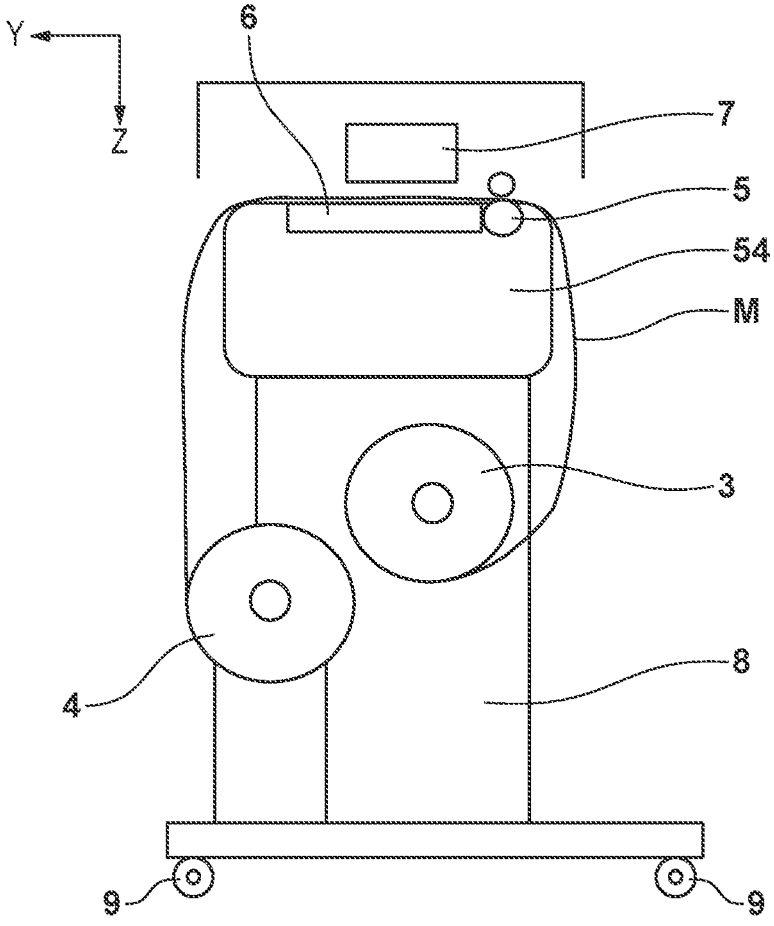
FIG. 2B is a schematic side view of the printing system.

FIG. 2A is a schematic front view of the printing system SY. FIG. 2B is a schematic side view of the printing apparatus 1.

In this embodiment, the printing apparatus 1 has various types of units for implementing a printing function incorporated in a housing (apparatus main body) 54. The housing 54 is supported by a pair of left and right stands 8 with casters 9. The printing apparatus 1 includes, in the housing 54, a feeding unit 3, a take-up unit 4, a conveying unit 5, a platen 6, a printhead 7, and a recovery unit 50. In addition, an operation panel 2 is installed on the housing 54. This allows the user to input and recognize a job (print job) for executing a printing operation, setting information required for the execution of the printing operation, and the like.

The feeding unit 3 holds a taken-up print medium (roll sheet) M, and the conveying unit 5 can feed the print medium M. The conveying unit 5 can convey the print medium M received from the feeding unit 3. The printhead 7 performs printing on the conveyed print medium M on the platen 6. Note that a print medium according to the present invention is not limited to a roll sheet, and the present invention can also be applied to other types of print media such as sheets of paper.

Assume that the printhead 7 is a printing unit that performs printing by an inkjet scheme. The printhead 7 is provided with a plurality of nozzles that can discharge a liquid (mainly ink) and incorporates liquid discharging elements in correspondence with the respective nozzles. Each liquid discharging element may be configured to generate energy for discharging a liquid and is typified by an electrothermal conversion element (heater element), a piezoelectric element, and the like.

Note that in this case, the printhead 7 is a serial head that performs printing by scanning in a direction intersecting the conveying direction of the print medium M (that is, the X direction). However, another example of the printhead 7 may be an elongated line head extending in the X direction so as to include the widthwise direction of the print medium M.

The take-up unit 4 takes up the print medium M having undergone printing by the printhead 7. After the printing operation, the printed print medium M may be cut by the user with scissors or the like but may be cut by scanning a cutter unit (not shown).

The recovery unit 50 is arranged outside a region (image formation region) where the printhead 7 as a serial head executes printing and can perform a predetermined recovering operation with respect to the printhead 7. Examples of the recovering operation include a preliminary discharging operation for the printhead 7, a maintenance operation, and the like. The preliminary discharging operation includes causing each nozzle to discharge a predetermined amount of liquid before and after a printing operation or as part of a maintenance operation. This makes it possible to properly implement a printing operation. The maintenance operation includes removing ink residue in each nozzle by suction. This makes it possible to properly implement a printing operation.

In this embodiment, the housing 54 extends outside the pair of left and right stands 8, and the recovery unit 50 is arranged on the outside. A carriage motor for driving a carriage that scans the printhead 7 can be arranged on the opposite side to the recovery unit 50 (the carriage and the carriage motor are not shown).

The liquid supply apparatus 10 is configured to supply a liquid to the printing apparatus 1 described above. As described above, a liquid that can be supplied by the liquid supply apparatus 10 is mainly ink. Examples of such ink include solvent-based ink such as water-based ink, latex ink, and eco-solvent ink. Other known inks may be used. Components (a pigment, a solid, and the like) of such ink precipitates with the lapse of time. The mode of the precipitation (for example, the precipitation rate) can vary depending on the particle sizes of components contained in the ink, an additive and the like, and ink type (for example, color). The liquids that can be supplied by the liquid supply apparatus 10 can include, in addition to the ink described above, a reaction liquid for fixing the ink discharged on the print medium M on the surface of the print medium M, and a maintenance liquid used for a recovering operation by the recovery unit 50.

Ink is sometimes simply described as it is, but its contents can also be applied to "liquid" without departing from the gist of the present invention.

Like the casters 9 of the printing apparatus 1, casters 12 are installed on the bottom portion of the liquid supply apparatus 10 to allow the liquid supply apparatus 10 to move on the floor. The liquid supply apparatus 10 includes a plurality of tray holders 13 juxtaposed in the up-down and left-right directions. Each tray holder 13 can hold a tank 40 as a retaining container that retains a liquid such as ink. Although described in detail later, the tank 40 is a deformable bag-like flexible container.

Each tank 40 has a liquid channel (a channel 57 in FIG. 6A) formed so as to be connected with a flexible tube. A duct hose 11 connected to the back surface of the printing apparatus 1 is provided on the back surface of the liquid supply apparatus 10. These flexible tubes can be accommodated in the duct hose 11. In this manner, the liquid supply apparatus 10 allows each tank 40 to supply a corresponding liquid to the printing apparatus 1 through the duct hose 11.

The liquid supply apparatus 10 is provided lower than the housing 54 of the printing apparatus 1. This allows the liquid supply apparatus 10 to be accommodated below the housing 54 extending outside the pair of left and right stands 8, thereby enabling a reduction in the size of the printing system SY. In addition, the printing apparatus 1 and the liquid supply apparatus 10 can be mutually coupled to each other through a predetermined coupling member 53. This makes it possible to integrate both the printing apparatus 1 and the liquid supply apparatus 10 and move the printing system SY to a desired position.

The following will exemplify the mode of juxtaposing the plurality of tray holders 13 in the up-down and left-right directions. However, the numbers of tray holders in the up-down direction and/or the left-right direction are not limited to those in this case. For example, it is possible to increase the number of types of liquids for the purpose of improving the print quality or to increase the number of liquids of the same type for the purpose of improving the productivity. In this case, it is possible to increase the quantities of these liquids. For example, it is possible to increase the number of tray holder rows each having the tray holders 13 arranged in the up-down direction (two rows in this case).

The printing apparatus 1 further includes a waste cartridge 51 arranged on the opposite side to the liquid supply apparatus 10. The waste cartridge 51 is arranged below the housing 54 extending outside the pair of left and right stands 8. This makes it possible to reduce the size of the printing system SY. The waste cartridge 51 can receive the waste (waste ink) drawn by the recovery unit 50, and hence may be arranged near the recovery unit 50.

Figure 3A:
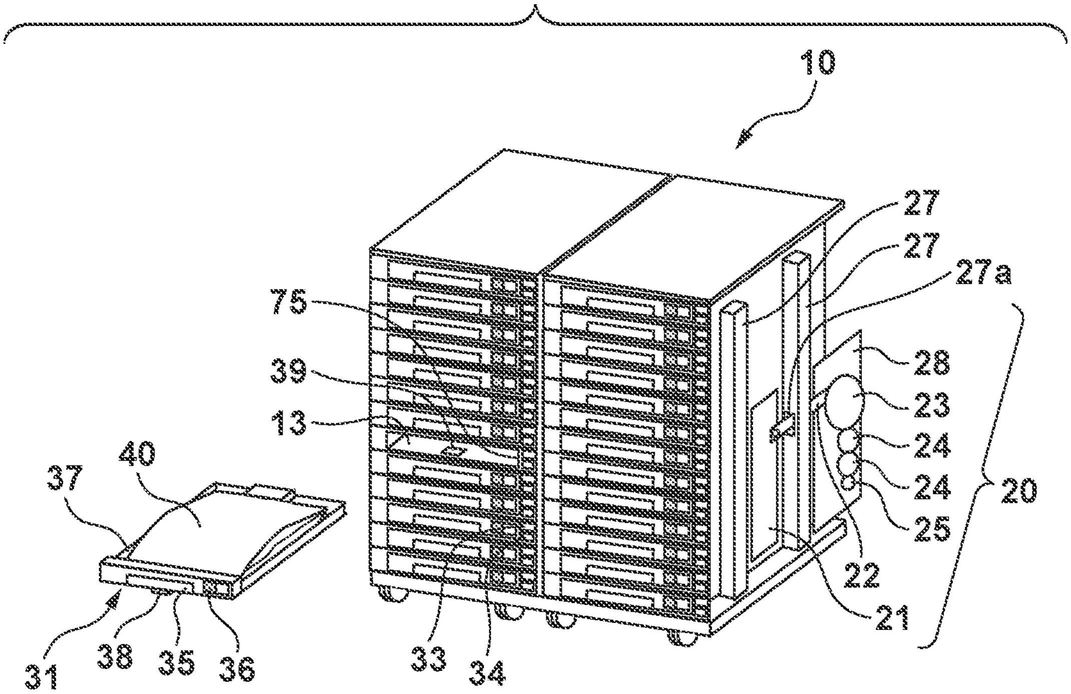
FIG. 3A is a schematic view showing the internal structure of a liquid supply apparatus.
Figure 3B:
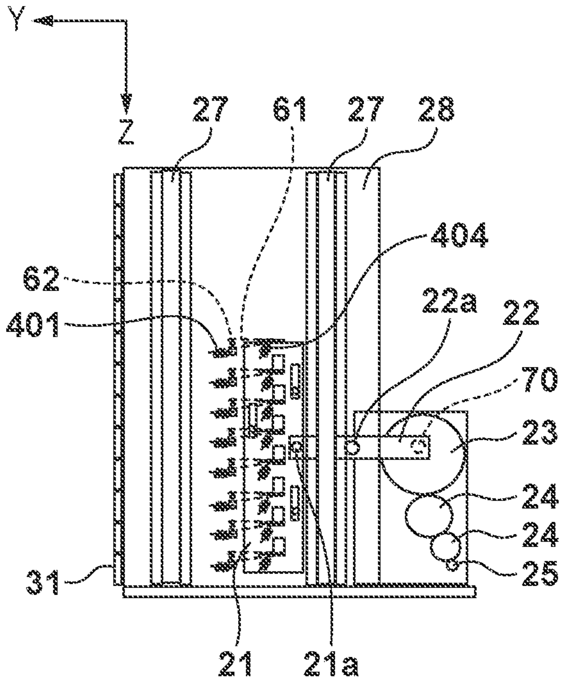
FIG. 3B is a schematic view showing the internal structure of the liquid supply apparatus.
Figure 3C:
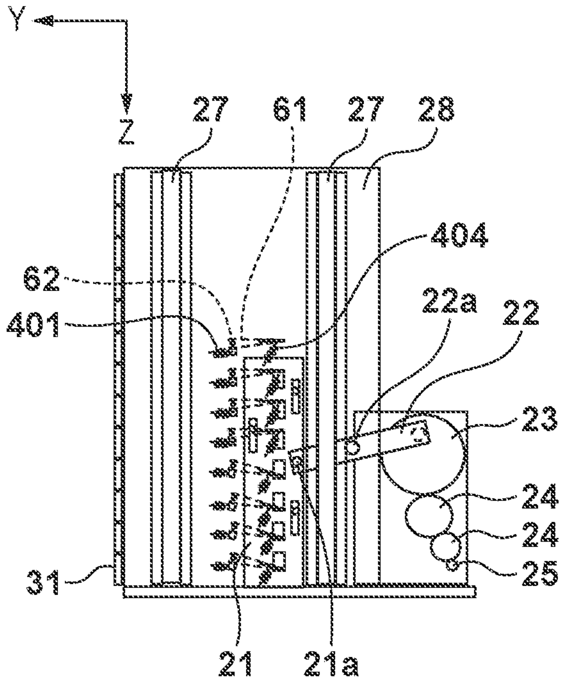
FIG. 3C is a schematic view showing the internal structure of the liquid supply apparatus.

FIG. 3A is a perspective view showing the internal structure of the liquid supply apparatus 10. Although described in detail later, FIGS. 3B and 3C are schematic side views. As shown in FIG. 3A, each tray holder 13 can hold a tray 31. The tray 31 includes a grip portion 35, a lock operation unit 36, and a tank receiving unit 37. The lower surface of the tray 31 (below the grip portion 35) is provided with a projection 38.

The tank receiving unit 37 corresponds to a placement surface on which the tank 40 can be placed. The user can insert and remove the tray 31 with respect to the tray holder 13 while the tank 40 is placed on the tank receiving unit 37 of the tray 31. In the following description, a state in which the tray 31 is inserted in the tray holder 13 is sometimes simply expressed as a set state.

The tray holder 13 is provided with a concave portion 39 with which the projection 38 is engaged in the set state of the tray 31. This can prevent the tray 31 from accidentally dropping off from the tray holder 13 when, for example, moving the liquid supply apparatus 10.

In this case, the projection 38 is configured to be inhibited from protruding from the lower surface of the tray 31 by operating the grip portion 35, and is made, for example, tiltable. That is, the user can make the lower surface of the tray 31 flat by operating the grip portion 35. With this operation, when removing the tray 31 from the tray holder 13, the user can disengage the projection 38 from the concave portion 39 by operating the grip portion 35 and pull out the tray 31 from the tray holder 13.

The lock operation unit 36 is a lock mechanism for restricting the pulling out of the tray 31 itself. Moving the lock operation unit 36 to, for example, one side in the X direction will set a lock state, whereas moving the lock operation unit 36 to the other side will set an unlock state. A tray lock detection sensor 75 is installed on a side (the right side in this case) of the tray holder 13. This makes it possible to detect the lock state and unlock state of the lock operation unit 36. The operation of the grip portion 35 can be permitted or restricted based on the detection result obtained by the tray lock detection sensor 75. That is, while the lock operation unit 36 is in the lock state, the engagement between the projection 38 and the concave portion 39 cannot be canceled by the operation of the grip portion 35. In contrast, while the lock operation unit 36 is in the unlock state, the engagement between the projection 38 and the concave portion 39 can be canceled by the operation of the grip portion 35.

Stirring of Liquid

As exemplarily shown in FIGS. 3B and 3C, a pressing operation of pressing the tank 40 and a pressing cancellation operation of canceling the pressing are repeatedly performed with respect to the tank 40 placed on the tray 31 in the set state, thereby making it possible to stir the liquid in the tank 40. Note that FIG. 3B shows a pressing cancellation state, and FIG. 3C shows a pressing state. The liquid supply apparatus 10 includes a stirring driving unit 20 for stirring the liquid in the tank 40.

The stirring driving unit 20 includes a lifting member 21, a drive transmission lever 22, a cam 23, a plurality of gears 24, a pressing portion lifting motor 25, and a fixing member 28. Plate-like members are used for the lifting member 21 and the fixing member 28. The fixing member 28 is fixed to the main body of the liquid supply apparatus 10. The fixing member 28 axially supports the cam 23 and the plurality of gears 24 and also fixes the pressing portion lifting motor 25 so as to transmit power (rotation) to the cam 23 and the gears 24. The fixing member 28 may be expressed as a driving mechanism holding plate or simply as a mechanism holding plate or the like. The lifting member 21 is coupled to the fixing member 28 through the drive transmission lever 22 and can move up and down upon receiving the power based on the pressing portion lifting motor 25 through the drive transmission lever 22.

Figure 4A:
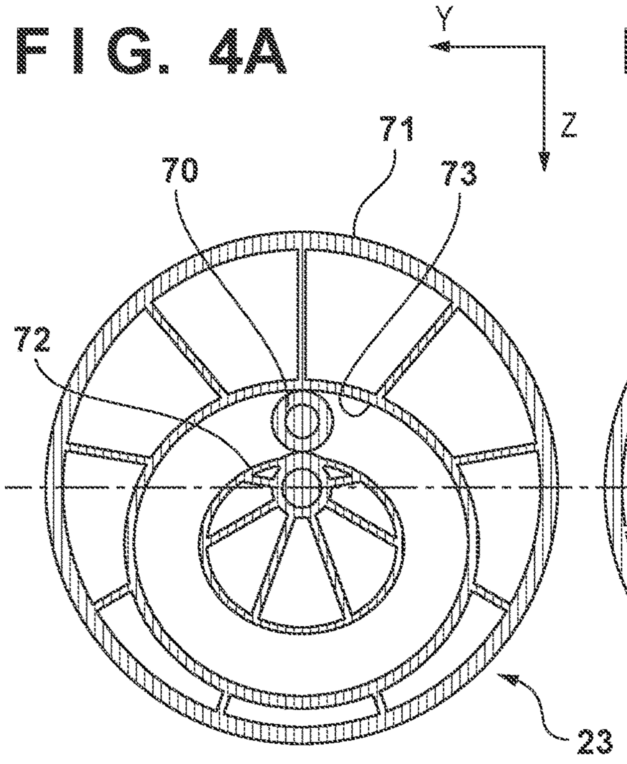
FIG. 4A is a schematic view showing an example of the arrangement of a cam in the internal structure of the liquid supply apparatus.
Figure 4B:
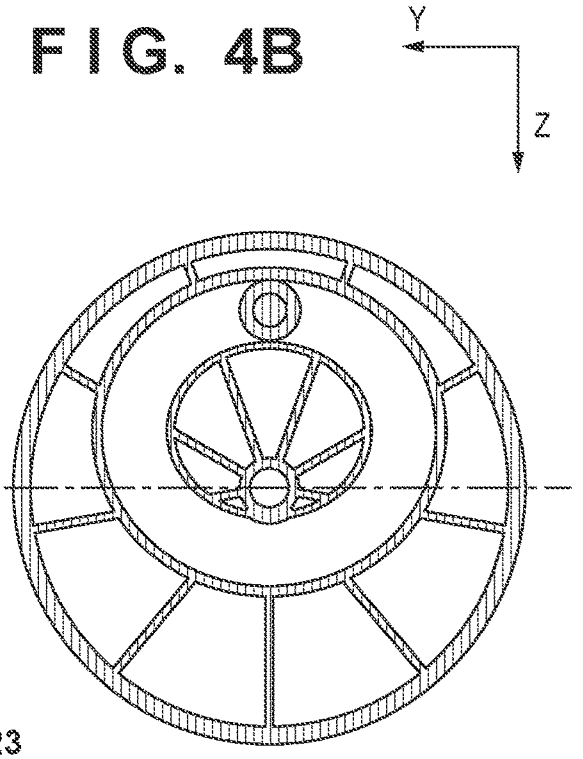
FIG. 4B is a schematic view showing an example of the arrangement of the cam in the internal structure of the liquid supply apparatus.

FIGS. 4A and 4B show an example of the arrangement of the cam 23 as part of the internal structure of the liquid supply apparatus 10. The cam 23 can alternately set a pressing state and a pressing cancellation state. The cam 23 includes a cam follower 70, a gear teeth portion 71, an inner cam surface 72, and an outer cam surface 73. The cam follower 70 axially supports the drive transmission lever 22 described above on one end portion. The gear teeth portion 71 meshes with the gear 24. The inner cam surface 72 and the outer cam surface 73 are formed so as to be deflected with respect to the overall cam 23 while forming a gap that can hold the cam follower 70.

With this arrangement, as the cam 23 rotates through the gears 24 based on the power of the pressing portion lifting motor 25, the cam follower 70 rotates so as to separate and approach with respect to the rotating shaft of the cam 23 while changing the distance to the rotating shaft. In this case, the cam follower 70 rotates and moves up and down based on the power of the pressing portion lifting motor 25. FIG. 4A shows a state in which the cam follower 70 has moved down. FIG. 4B shows a state in which the cam follower 70 has moved up.

The drive transmission lever 22 is axially supported by a shaft portion 22*a* at a central portion and is also axially supported by a shaft portion 21*a* on the other end portion side (on the opposite side to the cam follower 70). With this structure, when the cam follower 70 moves up and down based on the power of the pressing portion lifting motor 25, the drive transmission lever 22 can move the lifting member 21 up and down on the other end portion side. In this manner, the cam follower 70 reciprocates in the up-down direction while the cam 23 makes one rotation. Along with this rotation, the lifting member 21 makes one reciprocation in the up-down direction.

Referring to FIGS. 3B and 3C again, a side surface portion of the liquid supply apparatus 10 is further provided with a pair of front and rear pillar portions 27 extending in the Z direction. This can ensure the strength or toughness of the liquid supply apparatus 10. FIG. 3A shows the pillar portions 27 provided on one side surface portion of the liquid supply apparatus 10. However, the pillar portions 27 may also be provided on the other side surface portion. In this embodiment, the lifting member 21 is arranged between the pair of front and rear pillar portions 27, and the fixing member 28 is arranged on a side behind (−Y direction side of) the pair of front and rear pillar portions 27. The drive transmission lever 22 that couples these components to each other is arranged to extend through an insertion hole 27*a* provided in the pillar portion 27. This arrangement allows the lifting member 21, the drive transmission lever 22, and the fixing member 28 to be arranged to overlap the pillar portion 27 and makes it possible to achieve a reduction in size in the X direction while ensuring the strength of the liquid supply apparatus 10.

The drive transmission lever 22 may be unitized with the fixing member 28. In this case, the drive transmission lever 22 can be relatively easily attached/detached with respect to the liquid supply apparatus 10 together with the fixing member 28. This provides advantage in maintenance and the like. Fastening for this attachment/detachment may be implemented on the rear surface side of the liquid supply apparatus 10. In this case, there is no need to separate the plurality of tray holders 13 adjacent to each other in the left-right direction. This provides advantage in further increasing the number of tray holders 13 in the left-right direction.

As shown in FIGS. 3B and 3C, in association with the lifting member 21, elastic members 401 and 404 and a pressing member 61 are attached to each tray holder 13. Known springs may be used for the elastic members 401 and 404.

The pressing member 61 may be provided to be able to press the tank 40 that is a deformable bag-like flexible container and is axially supported rotatably by a pivot shaft 62. A metal plate can be used for the pressing member 61. However, other types of materials that satisfy the strength standard may be used. Although the pressing member 61 may be a simple plate material, a swingable member may be additionally attached to a portion of the pressing member 61 which abuts the tank 40.

The elastic member 401 is fixed to the tray holder 13 on the one end portion side and is fixed to the pressing member 61 on the other end portion side. The elastic member 404 is fixed to the lifting member 21 on the one end portion side, and is fixed to the pressing member 61 on the other end portion side. The elastic members 401 and 404 each bias the pressing member 61 so as to make the pressing member 61 pivot in the direction in which the tank 40 is pressed (a CW direction (clockwise direction) in FIGS. 3B and 3C).

For example, in the state in FIG. 3B (the pressing cancellation state with the pressing member 61), the lifting member 21 is in the ascent state. At this time, the lifting member 21 comes into contact with the pressing member 61 to move it up.

The state in FIG. 3C (the pressing state with the pressing member 61) differs in phase from the pressing cancellation state by 180° in a rotation cycle of the cam 23. In this state, the lifting member 21 is in the descent state. At this time, the lifting member 21 separates from the pressing member 61, and the pressing member 61 pivots and descends in the CW direction based on biasing by the elastic members 401 and 404 to come into contact with the tank 40 on the pressing surface (a pressing surface 61*a* in FIGS. 6A and 6B) and press the tank 40.

With this arrangement, alternately repeating a pressing state and a pressing cancellation state using the stirring driving unit 20 can stir the liquid in the tank 40.

In the pressing state in FIG. 3C, of the eight tray holders 13 shown in FIG. 3C, the tanks 40 in the upper four tray holders are sufficiently filled with a liquid (a filled state), and the tanks 40 in the lower four tray holders have no liquid left (the empty state).

According to this arrangement, in a pressing state, in the empty state of the tank 40, the extension amounts of the elastic members 401 and 404 are small, whereas in the filled state of the tank 40, the extension amounts of the elastic members 401 and 404 are large. Accordingly, as the liquid is used, the loads added to the elastic members 401 and 404 decrease, and hence the strength of the elastic members 401 and 404 need not be unnecessarily high. In this embodiment, the elastic members 401 and 404 each are adjusted such that the load added to the pressing surface 61*a* becomes about 500 gf (gram weight) with respect to the tank 40 in the filled state and becomes about 300 gf with respect to the tank 40 in the empty state.

Each tray holder 13 (each stage) is provided with this arrangement. Accordingly, even when the remaining amounts of liquids in the tanks 40 between the plurality of tray holders 13 differ from each other, each tank 40 is properly pressed. The stirring driving unit 20 described above may be provided for one row of tray holders 13 in the up-down direction. That is, a plurality of (two in this case) stirring driving units are provided in accordance with the quantity of tray holders 13 in the left-right direction.

Figure 5:
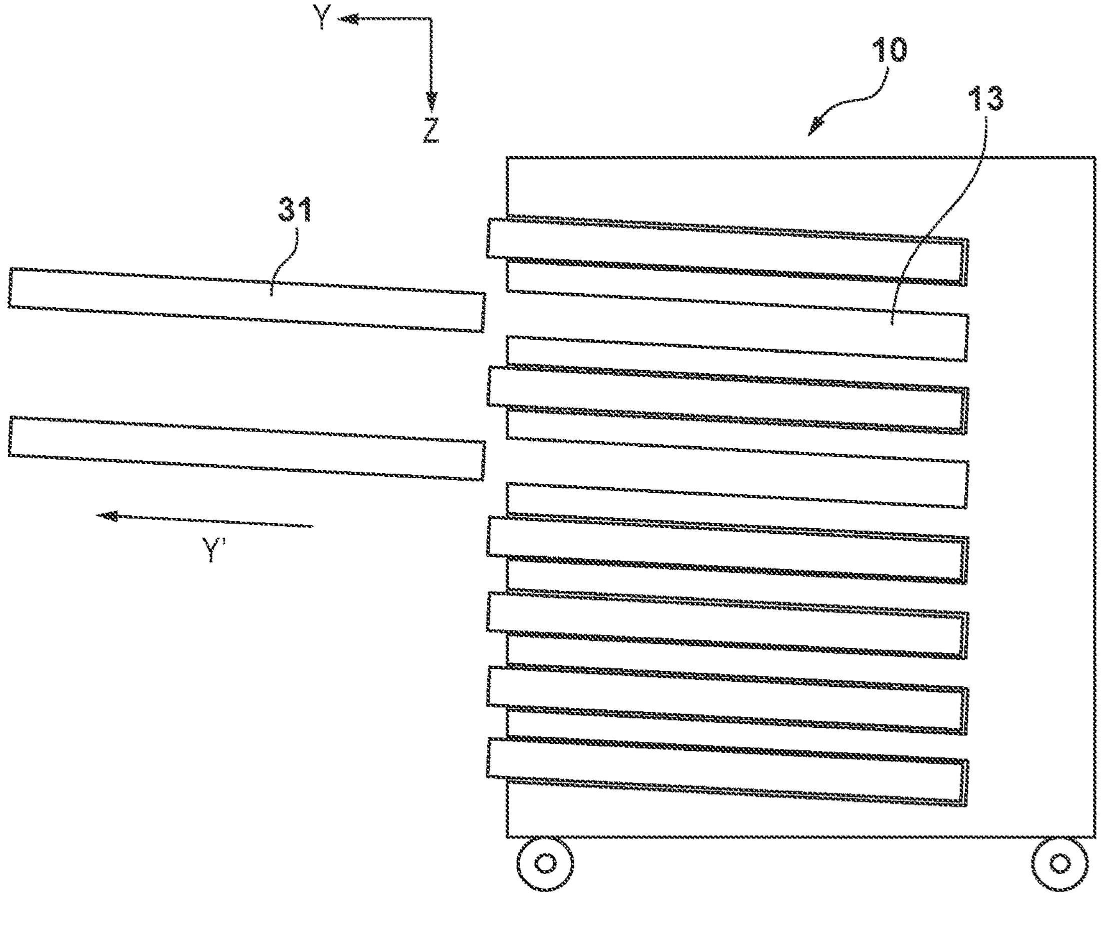
FIG. 5 is a schematic side view showing an example of the arrangement of a tray holder of the liquid supply apparatus.

FIG. 5 is a schematic side view showing an example of the arrangement of the tray holders 13 in the liquid supply apparatus 10. Each tray holder 13 can hold the tray 31 in an inclined posture. The tray 31 in a set state is positioned lower (on the +Z side) toward the rear surface side (the −Y side). With this arrangement, the tank 40 is placed on the tray 31 so as to be inclined to make a side on a side of a supply port 41 be located lower than a side on the opposite side. The inclination angle (the angle defined by a horizontal plane) is preferably 45° or less, for example, 10° or less. This angle is 3° in this embodiment.

Figures 6A, 6B:
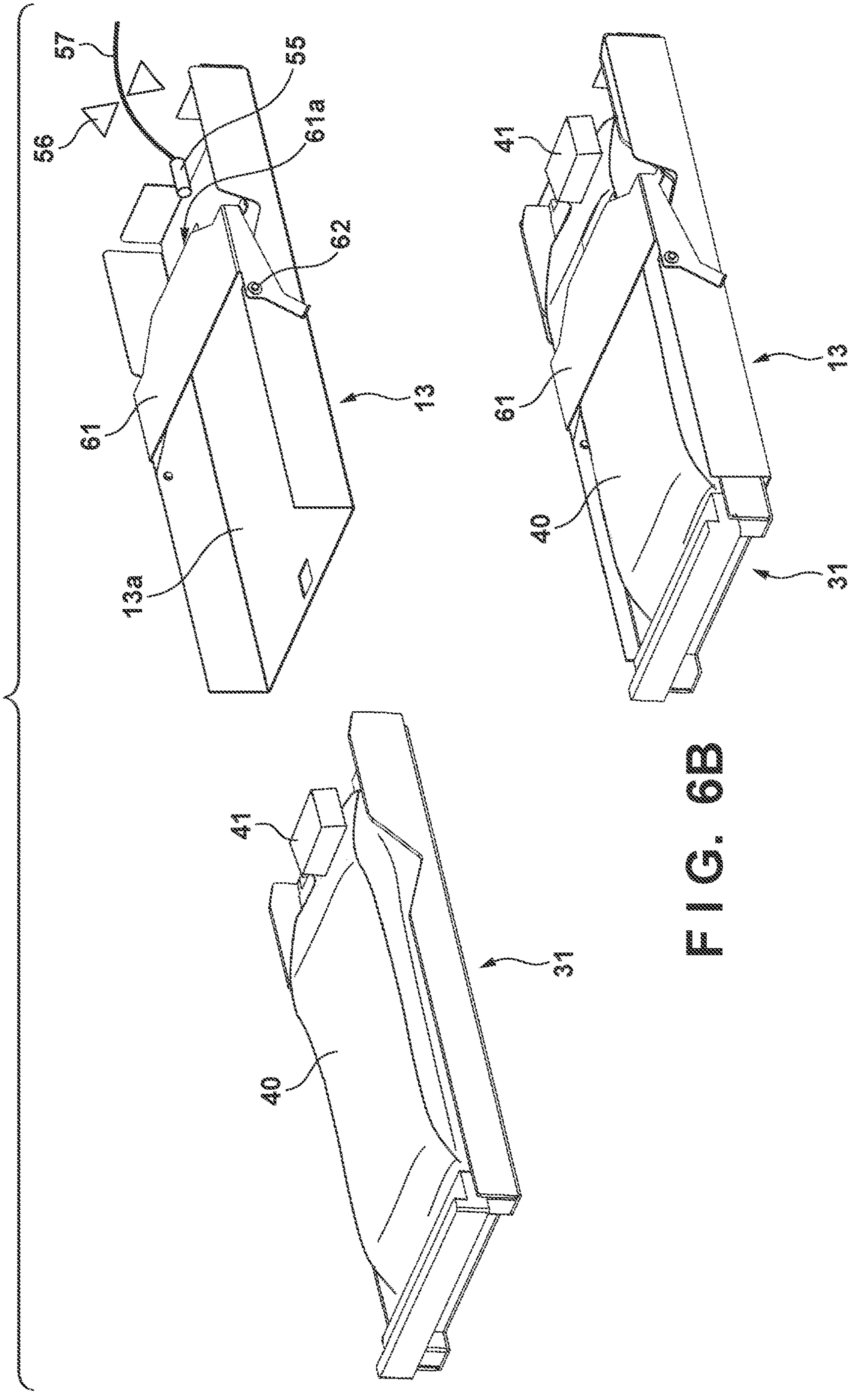
FIG. 6A is a perspective view showing the positional relationship between the tray holder and a tray on which a tank is placed.
FIG. 6B is a perspective view showing the positional relationship between the tray holder and the tray on which the tank is placed.
Figure 7:
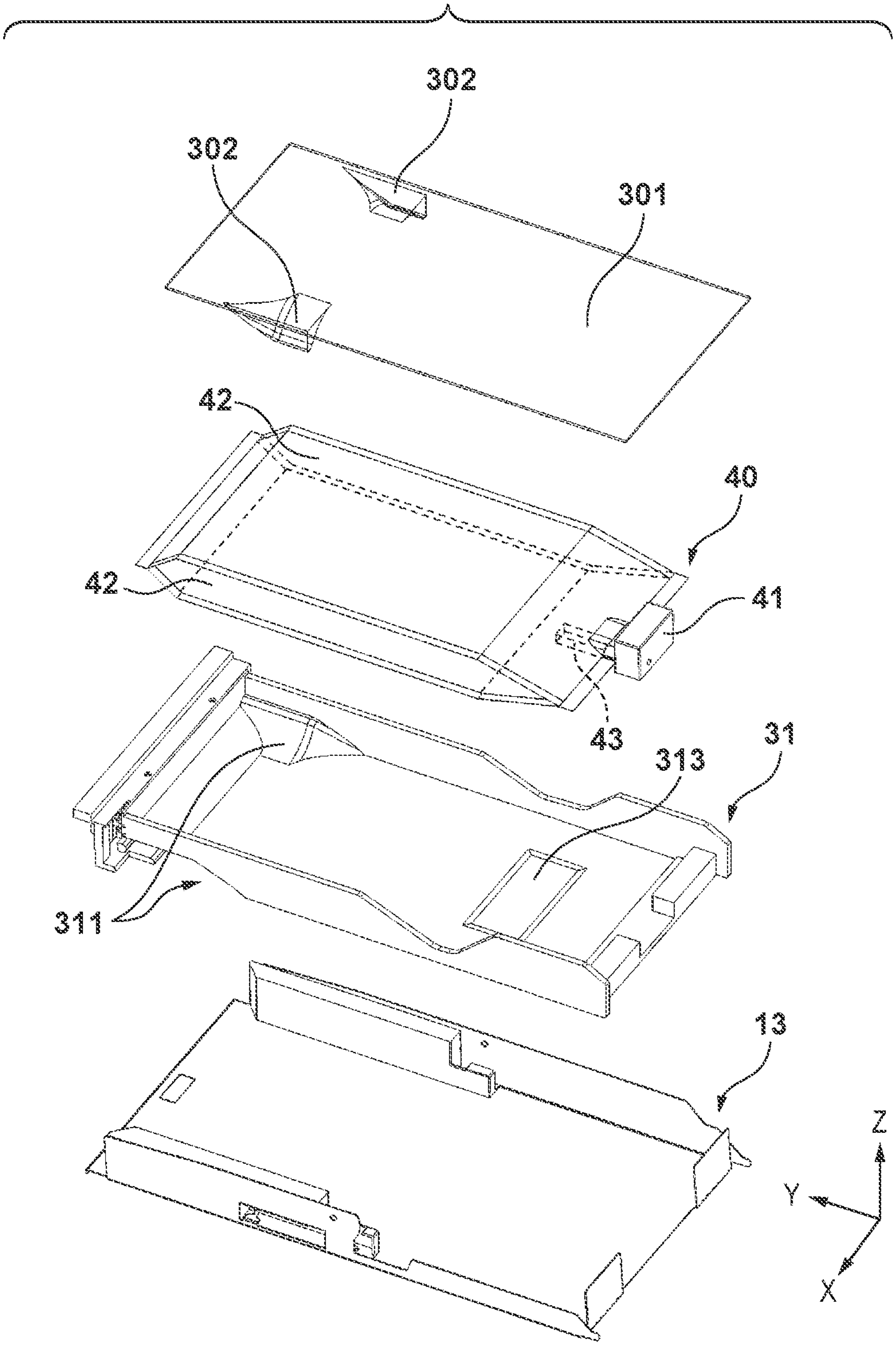
FIG. 7 shows perspective views showing the positional relationship between the tray holder and the tray on which the tank is placed.

FIGS. 6A and 6B are perspective views for explaining the positional relationship between the tray holder 13 and the tray 31 on which the tank 40 is placed. FIG. 6A shows a state before the tray 31 is inserted into the tray holder 13. FIG. 6B shows a state after the tray 31 is inserted into the tray holder 13. FIG. 7 shows a state in which the tray holder 13, the tray 31, and the tank 40 are separated from each other.

As described above, the tank 40 is a deformable bag-like flexible container. Two side surfaces of the tank 40 are provided with gusset portions 42 that increase the maximum retention amount of liquid and are foldable. The gusset portions 42 are welded to the front surface portion and the rear surface portion to form the bag-like tank 40. For example, the gusset portions 42 expand in a case where the remaining amount of liquid is sufficient and are folded as the remaining amount of liquid decreases. That is, the tank 40 deforms in accordance with the remaining amount of liquid. A material formed from a plurality of layers made of PET or the like is used for the tank 40. An aluminum layer may be used for the tank 40 to prevent it from undergoing a chemical reaction due to the contact of a liquid such as ink with air.

The tank 40 placed on the tray 31 is inserted into the tray holder 13 along a bottom surface (placement surface) 13*a*. One side of the tank 40 on the liquid supply side is provided with the supply port 41. The supply port 41 is coupled to an inlet 43 in the tank 40. In addition, the tray holder 13 is provided with a supply needle portion 55 on the liquid supply side. Inserting the needle portion 55 into the supply port 41 will release a valve in the supply port 41 and hydraulically couple the inside of the tank 40 to the channel 57, thereby making it possible to supply the liquid.

The channel 57 is provided with a channel valve 56. This makes it possible to control the opening/closing of the channel 57 with a switching motor (not shown). The channel valve 56 is set in an open state or closed state based on the detection result obtained by the tray lock detection sensor 75 described above. This makes it possible to prevent air from entering the channel 57 due to coming off of the needle portion 55 from the supply port 41 (accidental coming off of the tank 40 due to mainly vibration and the like) while the channel valve 56 is in an open state during the execution of a printing operation.

As described above, the lock operation unit 36 normally restricts the pulling out of the tray 31 itself. When pulling out the tray 31, the user operates the lock operation unit 36 to shift the open state of the channel valve 56 to the closed state based on the detection result obtained by the tray lock detection sensor 75.

In this embodiment, the width of the tank 40 (the length of the side provided with the supply port 41) is set to about 180 millimeters (mm), and the length of the tank 40 (the length of the gusset portion 42) is set to about 400 mm, so that the tank 40 can retain about 1.5 L of liquid. Note that the sizes of the tank 40 in the lengthwise direction and the widthwise direction may be interchanged or may be equal to each other.

Note that the shape of the pressing member 61 is not limited to the shape in this case. For example, another shape may be used for the pressing member 61 so as to reduce damage to the tank 40 which can be caused by the repetition of a pressing operation by the pressing member 61. For example, the size of the pressing surface 61*a* of the pressing member 61 may differ depending on the distance from the pivot shaft 62.

The gusset portions 42 of the tank 40 have relatively high rigidity owing to being welded on the front and rear surface portions. The gusset portions 42 expand outward when the remaining amount of liquid is sufficient, and need to be bent and folded inward when the remaining amount of liquid becomes small. The tank 40 is required to be pressed with a load satisfying a standard. Accordingly, the pressing surface 61*a* is preferably positioned inwardly from the gusset portions 42 in the X direction. As an example, the pressing surface 61*a* is preferably positioned inwardly from the gusset portions 42 while the tank 40 is folded. This reduces the influence of reactive force from the gusset portions 42 and allows the tank 40 to be properly folded. In this embodiment, the width of the gusset portion 42 is about 20 mm and becomes about 10 mm when folded. Accordingly, the pressing surface 61*a* may be positioned inwardly from (for example, 10 mm or more inwardly from) the gusset portions 42 when folded.

The liquid in the tank 40 is properly stirred (stirred almost entirely) by flowing in the lengthwise direction rather than the widthwise direction of the tank 40. Therefore, the shape or size of the pressing surface 61*a* is preferably designed so as to make the liquid in the tank 40 properly flow in the lengthwise direction rather than the widthwise direction. Serious consideration by the present inventor revealed that the size of the pressing surface 61*a* in the widthwise direction of the tank 40 is preferably ⅓ or more of a portion of the folded tank 40 which does not overlap the gusset portions 42. In this embodiment, the size of the folded tank 40 is about 180 mm in the X direction, and the width of the gusset portion 42 is about 20 mm (about 10 mm in the folded state). Accordingly, the size of the pressing surface 61*a* in the X direction is preferably, for example, about 60 mm to about 120 mm, and is set to 90 mm in this embodiment.

Although the pressing member 61 is brought into contact with the tank 40 by the pressing surface 61*a*, another embodiment may be configured to bring the pressing member 61 into contact with the tank 40 at one or more points.

Consumption Efficiency of Liquid

In the tank 40 as a deformable bag-like flexible container, when a liquid is supplied to the printing apparatus 1 and the gusset portions 42 are folded, the gusset portions 42 may not be properly folded due to their rigidity. In such a case, the liquid in the tank 40 may remain at portions of the gusset portions 42 which are not properly folded, and hence the liquid may not be properly consumed completely.

In this embodiment, as shown in FIG. 7, convex shapes 311 are provided on the placement surface of the tank 40 in the tray 31. A pair of convex shapes 311 may be provided on the left and right sides so as to be separated from each other in the widthwise direction (X direction). With this structure, the gusset portions 42 are lifted and held from below, and hence the liquid near the gusset portions 42 can be made to properly flow to the supply port 41 (substantially the inlet 43).

The convex shapes 311 may be positioned so as not to overlap the pressing member 61 from a viewpoint in the Z direction in order to prevent the gusset portions 42 lifted by the convex shapes 311 from interfering with pressing by the pressing member 61. In addition, a liquid can generally remain at the gusset portions 42 at positions spaced apart from the supply port 41, and hence the convex shapes 311 may be positioned apart from the supply port 41.

In addition, the convex shapes 311 are preferably formed so as to be inclined low toward the supply port 41. With this structure, the tank 40 as a flexible container is placed on the tray 31 so as to be smoothly bent in the Y direction. This makes it possible to properly guide the liquid in the tank 40 toward the supply port 41.

Likewise, the convex shapes 311 are preferably formed so as to be inclined low toward the inside of the tray 31. With this structure, the tank 40 as a flexible container is placed on the tray 31 so as to be smoothly bent in the X direction. This makes it possible to properly guide the liquid in the tank 40 to the central portion in the tank 40.

This arrangement makes it difficult for the liquid in the tank 40 to remain at the gusset portions 42 and hence makes it possible to properly consume the liquid completely.

In addition, the placement surface of the tank 40 in the tray 31 is provided with a concave shape 313. The concave shape 313 preferably has inclined surfaces at the peripheral portions. That is, the concave shape 313 is formed inclined so as to be shallower toward the outside in the widthwise direction and/or the front-back direction. With this structure, the tank 40 as a flexible container is placed on the tray 31 so as to be smoothly bent along the concave shape 313, and hence the liquid in the tank 40 can be easily retained above the concave shape 313. The concave shape 313 is preferably positioned near the supply port 41 (substantially the inlet 43) and is also preferably positioned to overlap the pressing surface 61*a* of the pressing member 61 from a viewpoint in the Z direction. That is, the pressing surface 61*a* of the pressing member 61, the inlet 43, and the concave shape 313 are preferably positioned to overlap each other from a viewpoint in the Z direction.

Figure 8A:
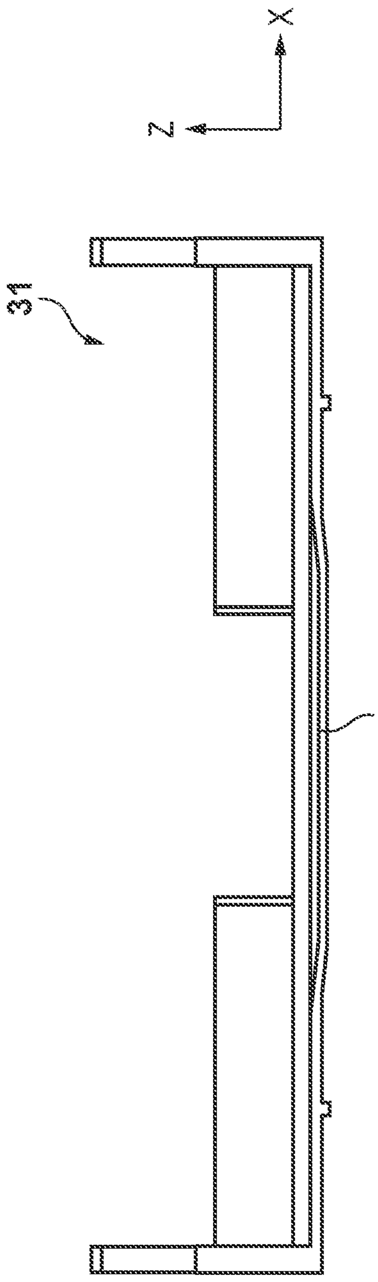
FIG. 8A is a schematic sectional view of a tray.
Figure 8B:
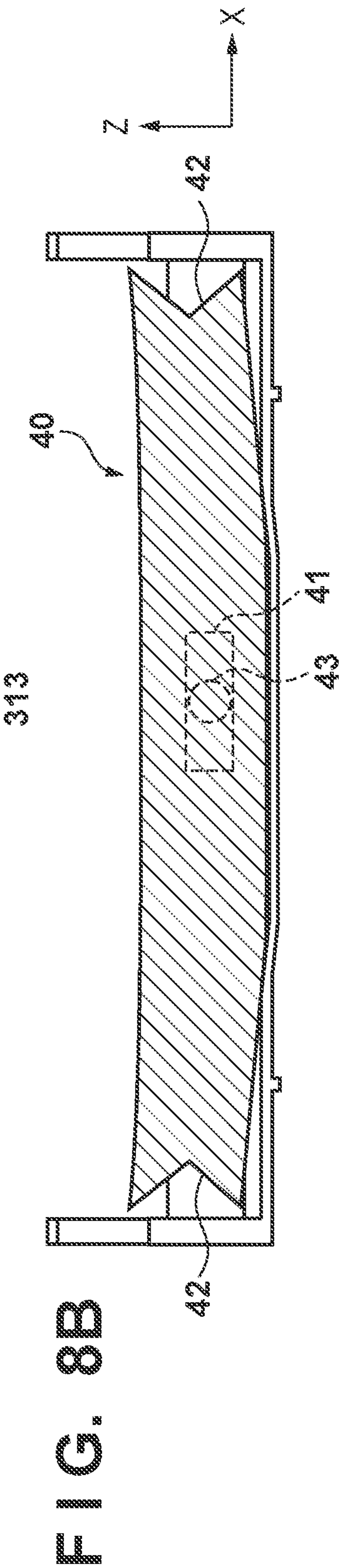
FIG. 8B is a schematic sectional view of the tray.

FIGS. 8A and 8B are schematic sectional views each taken along a cutting plane passing through the concave shape 313 of the tray 31. FIG. 8A shows a state in which the tank 40 is not placed. FIG. 8B shows a state in which the tank 40 is placed. As is obvious from FIG. 8B, since the bottom surface of the tray 31 has the concave shape 313, the tank 40 placed on the tray 31 is bent so as to sink along the concave shape 313. At this time, the concave shape 313 forming the lowermost surface of the tank 40 is preferably positioned to overlap the supply port 41 (in particular, the inlet 43) from a viewpoint in the Y direction in the tray 31 in an inclined posture in the set state. In order to implement this structure, the above inclination angle can be set.

According to such an arrangement, the tank 40 is folded accompanying the consumption of a liquid and is bent along the concave shape 313. This makes it easy for the liquid remaining in the tank 40 to be guided above the concave shape 313 and drawn at the inlet 43 and hence makes it possible to properly consume the liquid completely. In addition, since the concave shape 313 is positioned to overlap the pressing surface 61*a*, it is possible to properly stir the liquid guided above the concave shape 313. These equally apply to a case where the tank 40 is not provided with the gusset portions 42.

In addition, the convex shapes 311 and the concave shape 313 are preferably positioned to be shifted from each other in the Y direction. This prevents the convex shapes 311 from interfering with the pressing by the pressing member 61 above the concave shape 313.

As is obvious from FIG. 8B, the concave shape 313 is preferably positioned inward from the gusset portions 42 from a viewpoint in the up-down direction (Z direction). This allows the gusset portions 42 that are folded/being folded to move above accompanying the flow of the liquid remaining upon consumption to the central portion of the tank 40. Accordingly, the liquid at the gusset portions 42 is further properly guided to the central portion of the tank 40.

In general, a broken line can be formed on the gusset portion 42 to facilitate folding inward. However, a crease (a crease 305 in FIG. 10A or the like) different from the broken line may be formed on the gusset portion 42 due to the handling of the tank 40, an accidental load, or the like. Such a crease may not be eliminated upon consumption of the liquid (for example, may not be corrected by the broken line). This can be a cause for a failure to properly consume the liquid completely.

In this embodiment, therefore, as shown in FIG. 7, a top surface 301 of the tray holder 13 is provided with second convex shapes 302. A pair of left and right second convex shapes 302 are preferably provided so as to be separated from each other in the widthwise direction (X direction). The second convex shapes 302 are formed to be inclined low inward at positions where they overlap the gusset portions 42 from a viewpoint in the Z direction. With this structure, the gusset portions 42 are pressed from above to enable the liquid near them to properly flow toward the supply port 41 (substantially the inlet 43).

Figure 9:
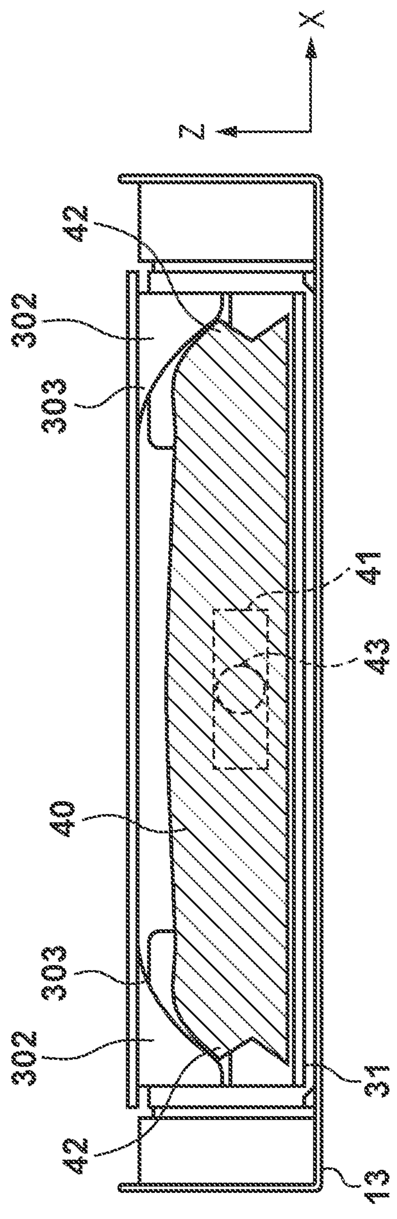
FIG. 9 is a schematic sectional view of the tray, the tray holder, and the top surface.

FIG. 9 is a schematic sectional view of the tray 31, the tray holder 13, and the top surface 301 taken along a cutting plane passing through the convex shape 302. The extension amount of the convex shape 302 from the top surface 301 is preferably set so as not to interfere with the insertion of the tray 31 on which the filled tank 40 is placed into the tray holder 13 and can be set based on the thickness of the tank 40, the height of the tray holder 13, and the like. The extension amount of the convex shape 302 can be set such that the gusset portion 42 of the tank 40 on the tray 31 in the set state overlaps the convex shape 302 (its apex portion). Alternatively, the extension amount of the convex shape 302 may be set to about ½ of the height of the tray holder 13.

Figures 10A, 10B, 10C:
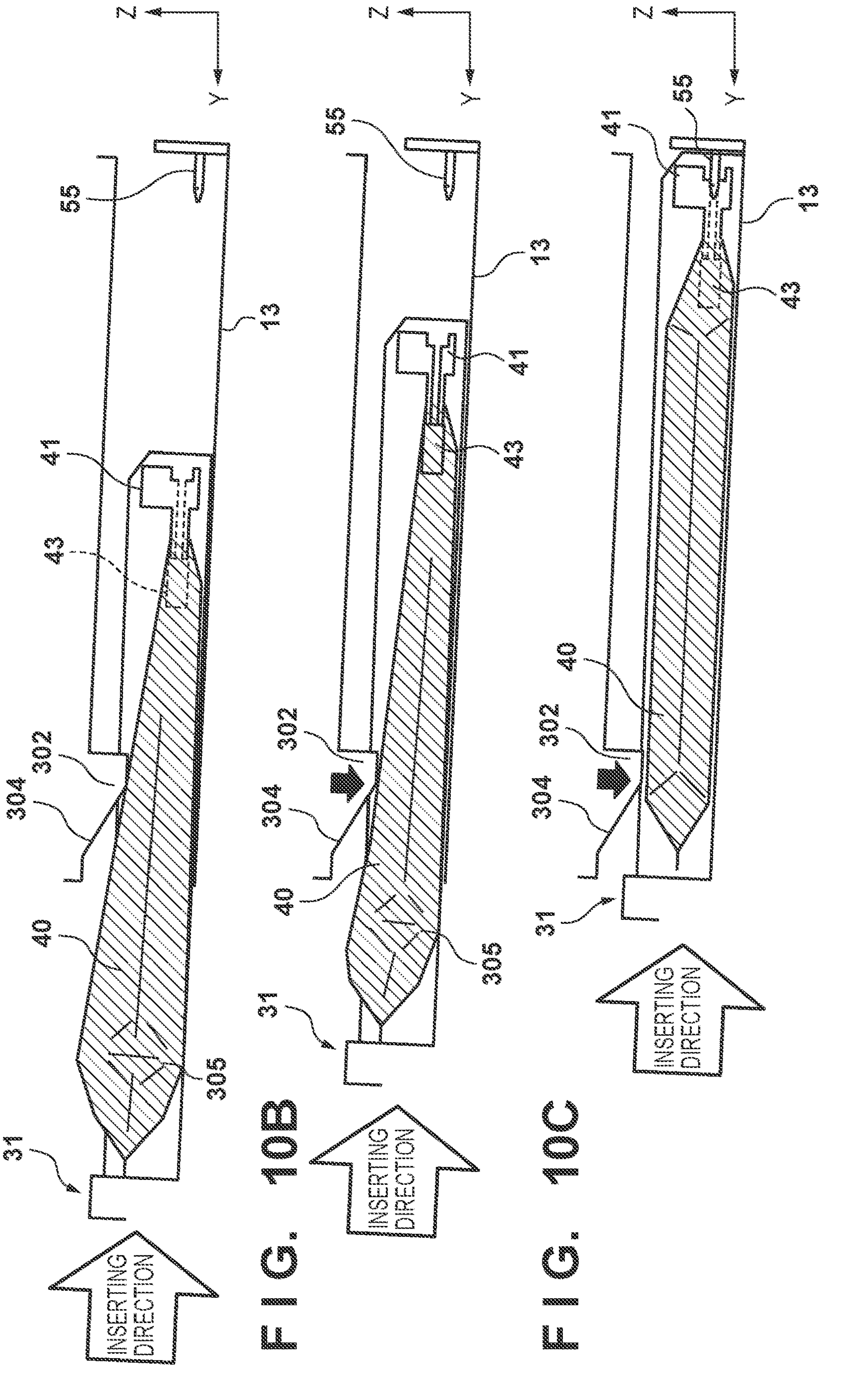
FIG. 10A is a schematic side view showing how the tray is inserted into the tray holder.
FIG. 10B is a schematic side view showing how the tray is inserted into the tray holder.
FIG. 10C is a schematic side view showing how the tray is inserted into the tray holder.

FIGS. 10A, 10B, and 10C are schematic side views showing how the tray 31 on which the filled tank 40 is placed is inserted into the tray holder 13. FIG. 10A shows a state in which the tray 31 is being inserted in the tray holder 13. FIG. 10B shows a subsequent state. FIG. 10C shows a state after the completion of the insertion.

As the tray 31 is inserted, the gusset portion 42 of the tank 40 is sequentially pressed from one end portion on the supply port 41 side (proximal end portion) to the other end portion (distal end portion) on the opposite side due to the relative sliding movement with the convex shape 302. For this reason, the gusset portion 42 is sequentially pressed from one end portion to the other end portion along the broken line. As described above, since the gusset portion 42 has relatively high rigidity, properly forming a fold following the broken line on the one end portion side will form the fold up to the other end portion side along the broken line accompanying the insertion of the tray 31. That is, the crease 305 is eliminated by the formation of a fold accompanying the insertion of the tray 31 and abutment against the convex shape 302.

In this manner, the crease 305 is eliminated, and a fold is properly formed on the gusset portion 42. In addition, the formed fold remains even after the completion of the insertion of the tray 31 due to the rigidity of the gusset portion 42. Thereafter, the gusset portion 42 is properly folded accompanying the consumption of the liquid.

In this case, as shown in FIG. 9, the convex shape 302 has an inclined surface 303 so as to decrease in height (decrease in extension amount) inward in the left-right direction (X direction). This shape prevents the filled tank 40 from being unnecessarily pressed and hence does not interfere with the insertion of the tray 31 on which the tank 40 is placed. Although FIG. 9 shows the inclined surface 303 having a curved shape, the inclined surface 303 may have a linear shape.

As shown in FIG. 10A and the like, the convex shape 302 has an inclined surface 304 so as to decrease in height outward in the front-back direction (Y direction). This shape makes sliding movement smooth between the tank 40 and the convex shape 302 and can prevent the gusset portion 42 from being unnecessarily bent and hence does not interfere with the insertion of the tray 31 on which the tank 40 is placed. Although FIG. 10A shows the inclined surface 304 having a curved shape, the inclined surface 304 may have a linear shape.

In addition, the convex shape 302 is preferably positioned on the opposite side of the pressing member 61 to the supply port 41 in the set state of the tray 31. With this structure, when the liquid at the gusset portions 42 from which the creases 305 are eliminated in the above manner is guided to near the inlet 43, the liquid is more properly stirred by the pressing operation of the pressing member 61. Accordingly, it is possible to properly stir the liquid even when the remaining amount of liquid in the tank 40 becomes small.

In this embodiment, the convex shapes 302 and 311 function as folding portions that fold the gusset portions 42. In addition, both the convex shapes 302 and 311 are provided at positions spaced away from the supply port 41 (substantially the inlet 43). In contrast to this, as is obvious from FIGS. 10C and 7, in the set state of the tray 31, the convex shape 302 may partially overlap the convex shape 311 from a viewpoint in the up-down direction (Z direction). In this embodiment, the convex shapes 302 and 311 may be positioned such that the inclined portions of the convex shapes face each other. This makes the gusset portions 42 have gentle twists and can ensure folds formed on the gusset portions 42.

In this embodiment, the convex shape 302 is integrally formed with the top surface 301 of the tray holder 13 but may be independently formed. The convex shape 302 may be fixed to the top surface 301 through an elastic member so as to be biased downward.

As described above, according to this embodiment, the tank 40 as a deformable bag-like flexible container is properly folded accompanying the consumption of a liquid. This makes it possible to properly consume the liquid remaining at the gusset portions 42. Accordingly, the embodiment is advantageous in improving the productivity of printing, achieving a reduction in cost, and the like.

Second Embodiment

The first embodiment described above has exemplified the mode of stirring the liquid in the tank 40 by a pressing operation by the pressing member 61. However, a liquid stirring mode is not limited to this mode and can be implemented by adding predetermined vibration to the liquid supply apparatus 10. In this case, the convex shape 311 can be designed without consideration on a pressing operation by the pressing member 61.

Figure 11A:
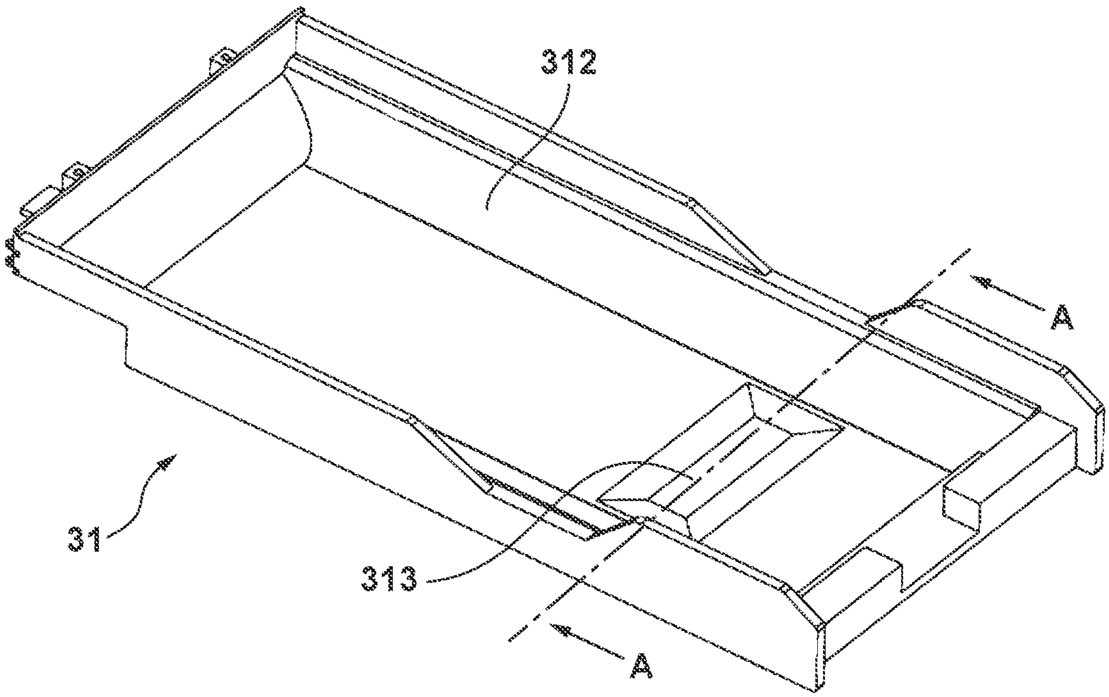
FIG. 11A is a view showing another example of the arrangement of the tray.
Figure 11B:
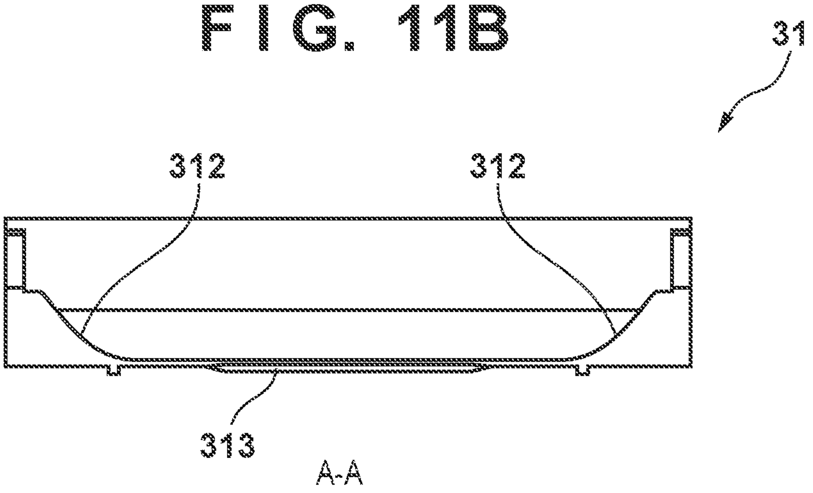
FIG. 11B is a view showing the other example of the arrangement of the tray.

FIGS. 11A and 11B show an example of the arrangement of a tray 31 according to the second embodiment. FIG. 11A is a perspective view of the tray 31. FIG. 11B is a schematic sectional view taken along a cutting plane passing through a line A-A.

In this embodiment, the tray 31 is provided with convex shapes 312 as folding portions extending throughout the entire region in the lengthwise direction (Y direction) instead of the convex shape 311. According to such shapes, gusset portions 42 of a tank 40 are lifted by the convex shapes 312 in the entire region in the front-back direction. This makes it easy to guide the liquid in the tank 40 to the central portion as a whole.

The convex shape 312 is preferably provided to be inclined low inward as in the first embodiment. This makes it easy for the liquid in the tank 40 to flow toward the central portion and makes it possible to further properly guide the liquid toward the central portion.

Even such an arrangement makes it possible to properly consume the liquid that can remain at the gusset portions 42 and hence can be said to be advantageous in improving the productivity of printing, achieving a reduction in cost, and the like.

Third Embodiment

Figure 12C:
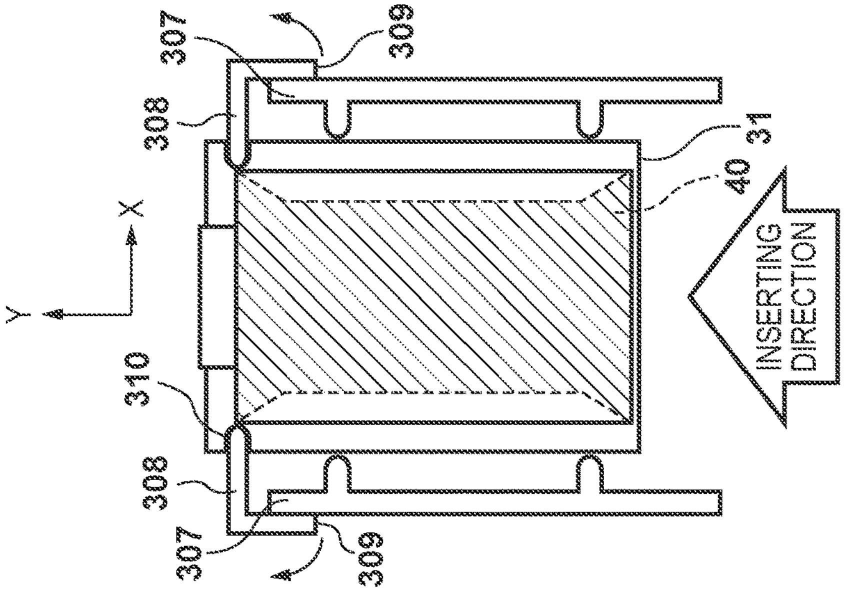
FIG. 12C is a view showing the other example of the arrangement of the tray and the tray holder.
Figure 12B:
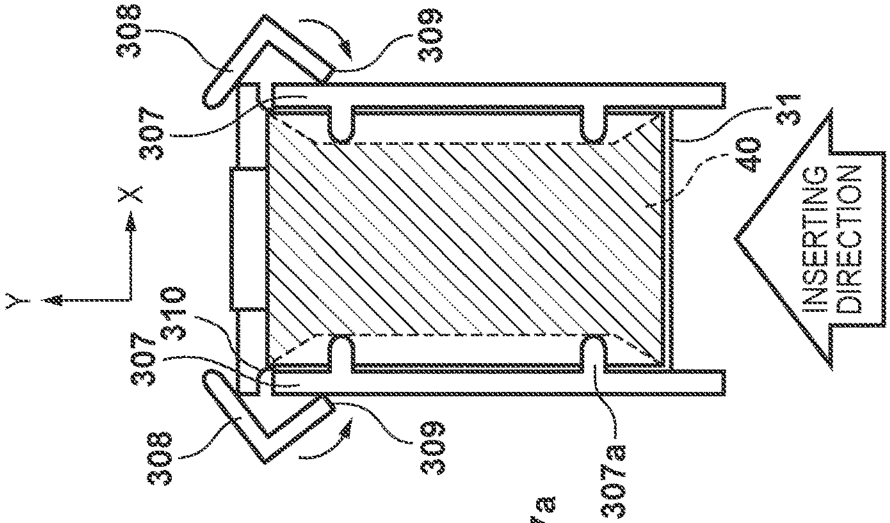
FIG. 12B is a view showing the other example of the arrangement of the tray and the tray holder.
Figure 12A:
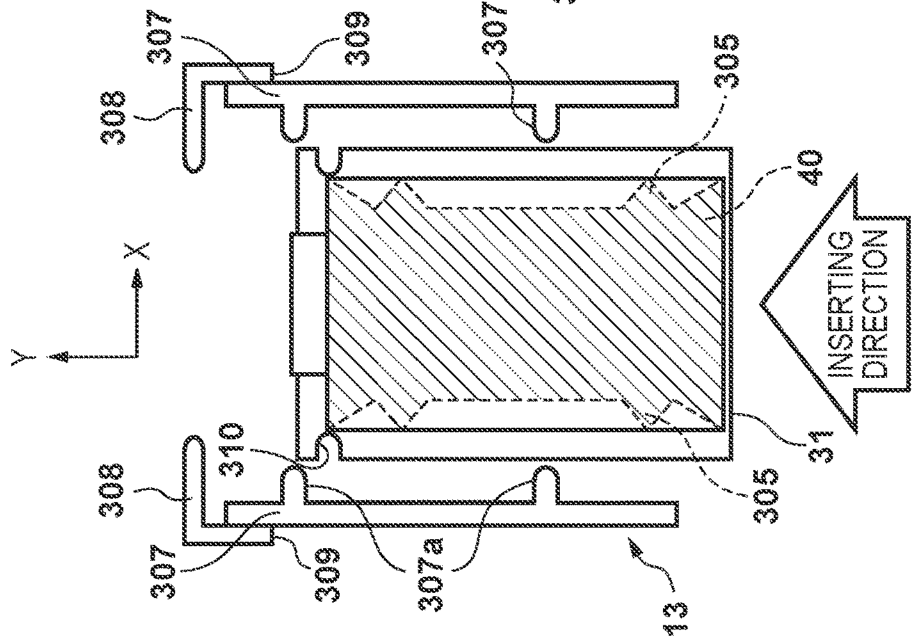
FIG. 12A is a view showing another example of the arrangement of the tray and the tray holder.

FIGS. 12A, 12B, and 12C show an example of the arrangement of a tray 31 and a tray holder 13 according to the third embodiment which are configured to eliminate creases 305 formed on gusset portions 42. FIG. 12A shows a state in which the tray 31 is being inserted in the tray holder 13. FIG. 12B shows a subsequent state. FIG. 12C shows a state after the completion of the insertion.

When a tank 40 as a deformable bag-like flexible container is in a vertical posture (a posture in which a supply port 41 faces in the up-down direction, and the gusset portions 42 extend in the vertical direction) or an inclined posture, a liquid flows to make one end side thicker than the other end side. For this reason, the creases 305 are easily formed on the gusset portions 42 when the tank 40 is in the vertical posture or the inclined posture as compared with when the tank 40 is in a horizontal posture (a posture in which the supply port 41 faces a side, and the gusset portions 42 are positioned in the horizontal direction). Typically, the creases 305 are tend to be formed on end portions of the gusset portions 42.

Accordingly, in this embodiment, a tray holder 13 includes pressing portions 307 that press the gusset portions 42 to eliminate the creases 305 and pivot portions 308 that pivot so as to move the pressing portions 307. As the pressing portions 307, a pair of left and right pressing portions are provided on two sides of the tray holder 13. As the pivot portions 308, a pair of left and right pivot portions are provided in correspondence with the pressing portions 307. Assume that the pressing portions 307 and the pivot portions 308 are biased by elastic members (not shown) so as to be fixed at the initial positions (the positions shown in FIG. 12A). In addition, the tray 31 is provided with locking portions 310 that can lock the pivot portions 308.

As shown in FIG. 12A, the pressing portion 307 is provided with a pair of abutment portions 307*a* that can abut against the two end portions of the gusset portion 42 on which the creases 305 tend to be formed. Assume that the pair of the abutment portions 307*a* are respectively provided on one end and the other end of the pressing portion 307. However, the number of abutment portions 307*a* is not limited to that in this case, and a plurality of abutment portions may be arranged along the inserting direction or integrally extend.

As shown in FIG. 12B, the pivot portions 308 engage with the tray 31 and pivot accompanying the insertion of the tray 31 on which the tank 40 is placed. The pivot portions 308 are provided with levers 309. The levers 309 move the pressing portions 307 inward accompanying the pivoting of the pivot portions 308. With this operation, the pressing portions 307 eliminate the creases 305 on the gusset portions 42, and folds along broken lines are properly formed on the gusset portions 42.

Subsequently, as shown in FIG. 12C, the pivot portions 308 return to the initial positions by being biased as described above and are locked by the locking portions 310 accompanying the completion of the insertion of the tray 31.

The arrangement of such folding portions eliminates the creases 305 that can be formed on the gusset portions 42 and hence enables proper consumption of the liquid that can remain at the gusset portions 42. Accordingly, this arrangement is advantageous in improving the productivity of printing, achieving a reduction in cost, and the like. In this embodiment, the tray holder 13 is configured by the movable mechanism including the pressing portions 307 and the pivot portions 308. However, the arrangement of the tray holder is not limited to this case as long as the tray holder is configured to press the creases 305.

[Others]

In the above description, the printing apparatus 1 using the inkjet printing method has been described as an example. However, the printing method is not limited to this. Furthermore, the printing apparatus 1 may be a single function printer having only a printing function or may be a multi-function printer having a plurality of functions such as a printing function, a FAX function, and a scanner function. In addition, the printing apparatus 1 may be a manufacturing apparatus configured to manufacture, for example, a color filter, an electronic device, an optical device, a microstructure, or the like by a predetermined printing method.

Furthermore, "print" in this specification should be interpreted in a broader sense. Hence, the mode of "print" is irrespective of whether or not the target to be formed on a print medium is significant information such as a character or graphic pattern, and is also irrespective of whether the target is manifested in a way that can be perceived visually by humans.

"Print medium" should also be interpreted in a broader sense, like "print". Hence, the concept of "print medium" can include not only paper used in general but also any materials capable of receiving ink, including fabrics, plastic films, metals, metal plates, glass, ceramics, resins, wood, and leathers.

"Ink" should also be interpreted in a broader sense, like "print". Hence, the concept of "ink" can include not only a liquid that is applied to a print medium to form an image, a design, a pattern, or the like but also an incidental liquid that can be provided to process a print medium or process ink (for example, coagulate or insolubilize color materials in ink applied to a print medium).

In the embodiments, individual elements are named by expressions based on their main functions. However, the functions described in the embodiments may be sub-functions, and the expressions are not strictly limited. Furthermore, the expressions can be replaced with similar expressions. In the same vein, an expression "unit (portion)" can be replaced with an expression "tool", "component", "member", "structure", "assembly", or the like. Alternatively, these may be omitted or added.

While the present invention has been described with reference to embodiments, it is to be understood that the invention is not limited to the disclosed embodiments but is determined by the scope of the following claims.

This application claims the benefit of Japanese Patent Application No. 2023-071690, filed on Apr. 25, 2023, which is hereby incorporated by reference herein in its entirety.

What is claimed is:

1. A liquid supply apparatus configured to supply a liquid to a printing unit, comprising a holder configured to hold a tray on which a flexible container configured to contain a liquid is placed, the holder allowing insertion of the tray in a first direction, wherein the container has a foldable gusset portion, and the holder is provided with a folding unit configured to fold the gusset portion in a state in which the tray is held by the holder, and wherein the folding unit includes a convex shape configured to press the gusset portion along a second direction towards the tray.

2. The liquid supply apparatus according to claim 1, wherein the convex shape is provided so as to overlap the gusset portion from a viewpoint in the second direction intersecting the first direction.

3. The liquid supply apparatus according to claim 1, wherein the convex shape has an inclination in at least one direction.

4. The liquid supply apparatus according to claim 3, wherein the inclination is formed along a third direction intersecting the first direction.

5. The liquid supply apparatus according to claim 3, wherein the inclination is formed along the first direction.

6. The liquid supply apparatus according to claim 1, wherein the holder includes a pressing member configured to press the container, and the convex shape and the pressing member do not overlap each other from a viewpoint in the second direction.

7. The liquid supply apparatus according to claim 1, wherein the folding unit includes a movable mechanism configured to press the gusset portion of the container in a case of inserting of the tray.

8. The liquid supply apparatus according to claim 1, wherein the tray includes a convex shape provided on a placement surface on which the container is placed and configured to lift the gusset portion in the second direction.

9. The liquid supply apparatus according to claim 8, wherein the container includes a supply port configured to supply a liquid to the printing unit, and the convex shape of the tray is provided so as to be positioned away from the supply port in a state in which the container is placed on the tray.

10. The liquid supply apparatus according to claim 8, wherein the convex shape of the tray has an inclination in at least one direction.

11. The liquid supply apparatus according to claim 10, wherein the inclination is formed along a third direction intersecting the first direction.

12. The liquid supply apparatus according to claim 10, wherein the inclination is formed along the first direction.

13. The liquid supply apparatus according to claim 8, wherein the holder includes a pressing member configured to press the container, and the convex shape of the tray and the pressing member do not overlap each other from a viewpoint in the second direction.

14. A printing system comprising:

a liquid supply apparatus according to claim 1; and a printing apparatus including the printing unit configured to perform printing by using a liquid supplied from the liquid supply apparatus.

15. A printing apparatus comprising:

a liquid supply apparatus defined in claim 1; and the printing unit configured to perform printing by using a liquid supplied from the liquid supply apparatus.

* * * * *